Patented May 17, 1938

2,117,657

UNITED STATES PATENT OFFICE 2,117,657

SILVER TARNISH INHIBITOR

Wilmer C. Gangloff and Russell H. Hieronymus, Cincinnati, Ohio, assignors to The Drackett Company, Cincinnati, Ohio, a corporation of Ohio No Drawing. Application December 31, 1934, Serial No. 760,048

5 Claims. (Cl. 148—8)

The present invention relates to silver tarnish inhibitors and has for an object the provision of a tarnish inhibitor that may be used on silverwares of all kinds.

Another object is to provide a product that is easily and quickly applied and which is not harmful to the silverware in the concentrations at which it is used.

Another object of the invention is to provide a product of this kind that is very inexpensive and which produces a tarnish resisting effect on silverware from 25 to 50 times greater than that of untreated silver.

These and other objects are attained by the means hereinafter fully disclosed.

Heretofore the prevention or inhibition of tarnish on silver has been entirely limited (1), to the use of lacquers which are not adaptable to use on silverware which comes in contact with food or with the mouth, and (2) chests or wrappings soaked with lead acetate or camphor.

It has been found that silver tarnish inhibitors that are not limited to the class of wares treated can be made using a reducing substance in an acid medium diluted in water or a solution including a buffer solution such as saturated NaCl solution or a mixture of them. The inhibitors of the invention preferably contain $SnCl_2.2H_2O$ as the reducing substance, although formaldehyde, acetaldehyde paraformaldehyde, Rochelle salts, reducing sugars, glycerol, manitol etc. are useful.

The aqueous acid medium, made slightly acid with a strong mineral acid would be made with hydrochloric acid etc.

It is to be understood that the solutions can be neutral or acid as conditions permit. The stannous chloride can be used as the tin salt ($SnCl_2.2H_2O$) or dehydrated $SnCl_2$.

The following represent good formulas but are not to be understood as limiting the invention thereto since various concentrations may be made requiring varying amounts of the substances set forth.

| | Parts |
|---|---|
| 1. $SnCl_2.2H_2O$ | 1 |
| HCl (sp.gr.=1.18–1.19) | 7 |
| Water | 1000 |

The stannous chloride is dissolved in the concentrated hydrochloric acid and to this a small amount of water is added to make a compound suitable for packaging purposes. For use the packaged product is diluted to the above stated proportions.

A buffer solution such as sodium chloride solution can be added for all or part of the water as in the following formula.

| 2. $SnCl_2.2H_2O$ | gram | 1 |
|---|---|---|
| HCl (22° Bé.) | cc | 6 |
| Saturated NaCl solution | cc | 5 |

This then to be added to one (1) quart of water.

Various formulas made, using $SnCl_2.2H_2O$ from one (1) to four (4) grams, HCl (sp. gr. 1.18–1.19) from one (1) to nine (9) cc. and water 1000 cc. and also other formulas wherein the range of $SnCl_2.2H_2O$ ranged from approximately 2 to 3¼ grams, water 1000 to 1600 cc. and using variously dilute HCl (approximately 18%) in amounts as low as 160 drops or concentrated HCl in amounts as high as 5¼ cc. provide the following general index from which various formulas can be intelligently selected.

1. The amount of stannous chloride necessary to give good tarnish inhibiting effect for solutions for household use will be 0.1%. For use in manufacturing silver plate of tarnish-proof quality a greater concentration, possibly up to approximately 4.0% will be desirable. Greater concentrations produce greater tarnish inhibiting effect, but not in direct proportion to the increase in concentration.

2. The concentration of hydrochloric acid gas present in the acid at the time of dissolving the stannous chloride therein determines the rate at which hydrated stannous oxide occurs or at which it would occur. In other words the concentration of hydrochloric acid in the formula determines whether the stannous chloride will remain as such and if not at what rate it forms the oxide. The HCl acid may lose some of its gaseous HCl upon prolonged storage and its subsequent use in making up the pickling bath or silver tarnish inhibitor of the invention may result in an inferior product. When the inhibitor or bath is prepared with acid of proper actual acid concentration the bath or a concentrated form of the bath for further dilution will remain stable and will not deposit hydrated stannous oxide on the wares. The solution should be made with the HCl molecular concentration sufficiently high to leave the $SnCl_2$ unaltered and thus provide a product which will be soluble and not form the hydrated oxide on great dilution.

The absence of hydrated stannous oxide formation is important since it precipitates on the silver surface, tending to shield it from the bath. Furthermore, when the articles are removed from the bath and washed they have a sticky feeling if this precipitate or gel deposits on them. When articles having this gel adhering thereto are subjected to ammonium sulfide atmosphere the stannous hydrate forms a black coating of stannous and/or stannic sulfide, giving the silver the appearance of being tarnished. This coating is readily removable with soap and water.

The treatment of silverwares with the inhibitor of the invention is extremely simple and consists merely in depositing the wares in a glass or stoneware utensil, or any metal utensil other than iron, aluminum, or zinc, of the solution (either warm or cold) and allowing the wares to remain in this tarnish inhibitor bath for 5 to 10 minutes. The bath solution is then poured off and the articles are rinsed in clear warm water and dried.

Temperature rise in the tarnish inhibitor bath will increase the inhibiting effect but it also causes a quicker formation of hydrated oxide, hence the working temperature depends upon the operation and the formula used.

It is believed that the tarnish-proofing effect is only a surface condition of little more than molecular thickness when produced according to the method recommended for household use because subsequent polishing with abrasive paste appears to almost destroy the tarnish-resisting power of an article. Prolonged treatment with a solution prepared for use at higher temperatures increases the depth of this surface effect. Such technic would be suitable for manufacturers and others under more skilled direction.

Reducing sugars and formaldehyde are effective in neutral solutions, and more so in acid solutions but under all conditions do not appear to be as efficient as the stannous chloride.

For merchandising to domestic household trade the solution can be of a concentration such that one teaspoonful may be added to one quart of water at approximately tapwater temperature for good tarnish inhibiting effect with a 5 to 10 minute immersion. Specific examples of such were previously set forth herein.

A product can be manufactured at moderate cost that will inhibit tarnish from 25 to 50 times longer than untreated ware. The time and labor required are almost negligible in applying the treatment and the time and labor for frequent cleaning with the well-known pastes are eliminated. It is relatively harmless in the dilutions in which it is actually used although as marketed it would be corrosive and poisonous and would have to be handled with care much like that exercised in the merchandising and use of lye.

From the foregoing it will be apparent that the invention may be adapted to a variety of silver tarnish inhibiting preparations adaptable to both household and industrial uses and to a somewhat varied working technic. These solutions or silver tarnish inhibiting pickling baths do not impair the burnish or luster of the silver surface and their use is particularly recommended to greatly prolong the life of plated wares while at the same time obviating the requirement for cleaning and polishing of silverwares of both the plated and solid varieties.

What is claimed is:

1. A compound for dilution with water for a silver tarnish inhibiting bath consisting of $SnCl_2$ and HCl in the proportions of from 1 to 4 grams $SnCl_2$ and HCl from 160 drops to 9 c. c.

2. A silver tarnish inhibiting bath comprising

| | Parts |
|---|---|
| $SnCl_2.2H_2O$ approximately | 1 |
| HCl (sp. gr.=1.18–1.19) do | 7 |
| Water do | 1000 |

3. A silver tarnish inhibitor comprising:

| | |
|---|---|
| $SnCl_2.2H_2O$ approximately, gram | 1 |
| HCl (22° Bé.) approximately, cc | 6 |
| Saturated NaCl solution do | 5 |

Above added to one (1) quart of water.

4. A silver tarnish inhibitor comprising a dilute slightly acid aqueous solution containing $SnCl_2$, HCl and NaCl.

5. A silver tarnish inhibiting bath consisting of stannous chloride dissolved in concentrated hydrochloric acid and diluted with water in the proportions of from one (1) to four (4) grams of stannous chloride, 160 drops to 9 c. c. of HCl, and water up to approximately one quart.

WILMER C. GANGLOFF.
RUSSELL H. HIERONYMUS.